UNITED STATES PATENT OFFICE.

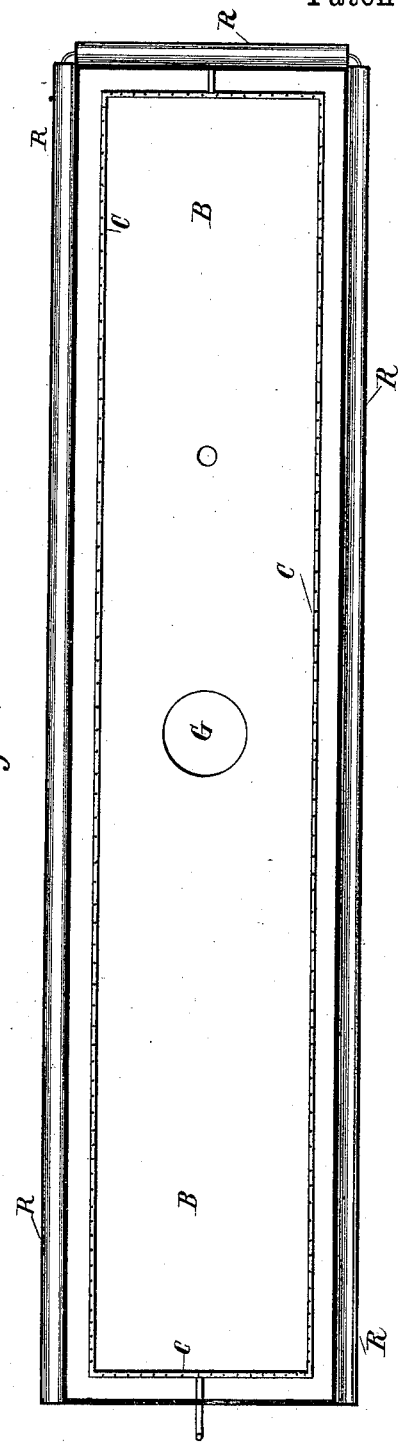

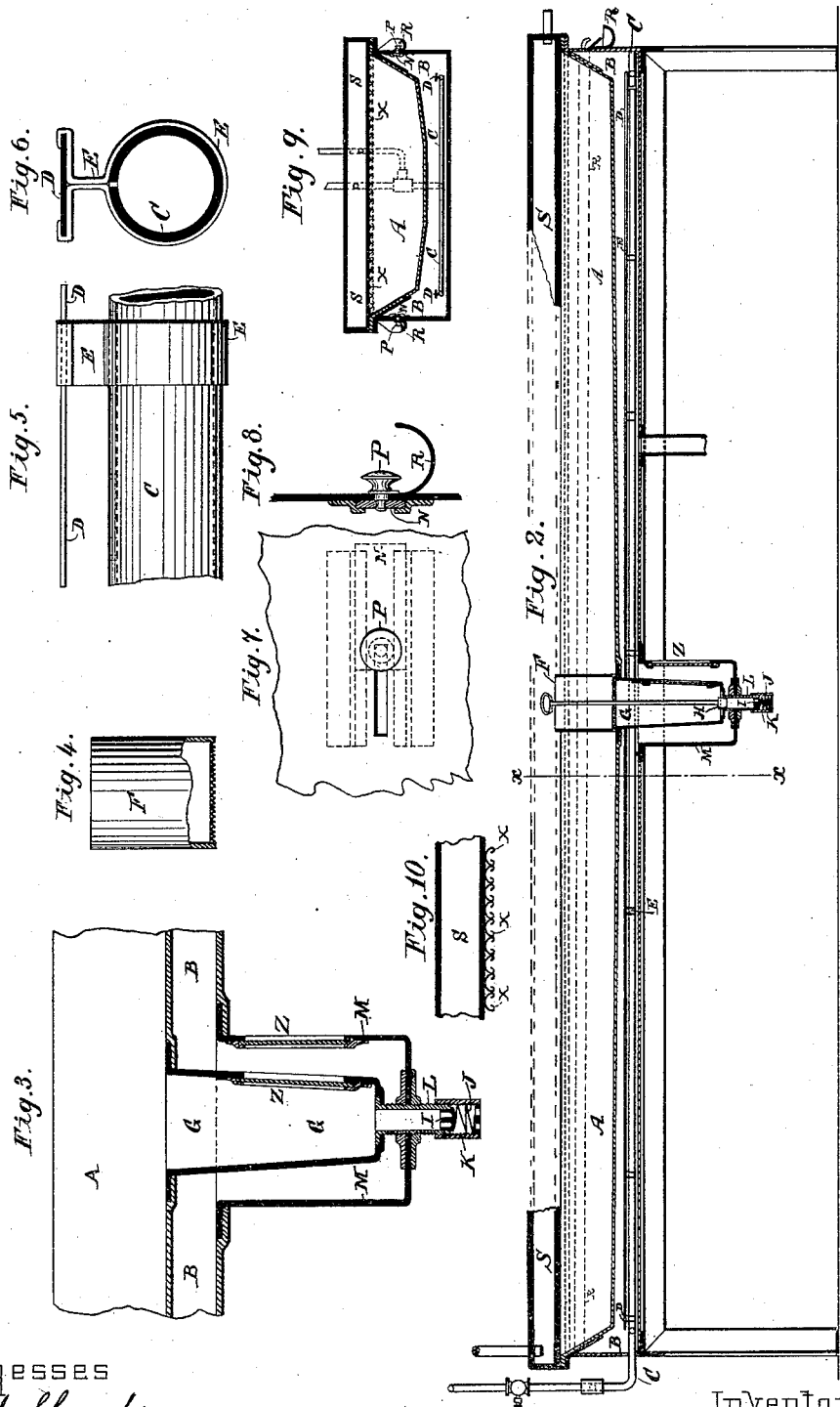

WILLIAM HORNER, OF CUDDINGTON, COUNTY OF CHESTER, ENGLAND.

APPARATUS FOR SEPARATING CREAM FROM MILK.

SPECIFICATION forming part of Letters Patent No. 304,644, dated September 2, 1884.

Application filed September 4, 1883. (No model.) Patented in England August 3, 1883, No 3,793.

*To all whom it may concern:*

Be it known that I, WILLIAM HORNER, of Cuddington, in the county of Chester, in the Kingdom of England, have invented certain new and useful Improvements in Apparatus for Separating Cream from Milk, of which the following is a specification.

My invention relates to an apparatus for treating milk and cream by means of steam; and the improvements consist in various features and details hereinafter more particularly described and claimed.

In the accompanying drawings, Figure 1 shows a part sectional plan of my apparatus; Fig. 2, a section; Fig. 3, enlarged view of plug-hole and contiguous parts; Fig. 4, central tube; Figs. 5 and 6, enlarged views of heating-tube fittings; Figs. 7 and 8, arrangement of slide for overflow of vat; Fig. 9, a cross-section of vat or tank on line *x x*, Fig. 2; Fig. 10, part of cover or lid.

A is a vat with bottom sloping down to the middle from all sides, and made of sheet-copper, by preference.

B is a jacket or space surrounding the said vat. This jacket can at will be filled with hot or cold water or steam.

C is a heating-tube. This tube enters, preferably, at the end of the vat, as shown, and forks at right angles. At the end of each fork is a longitudinal tube extending nearly the entire length of the vat. These two tubes are perforated above, and over these perforations a long deflector, D, Fig. 5, is fixed tightly in place by socket-saddles E. This deflector can be turned when cooling is required, allowing the cooling-fluid to strike direct upon the under surface of the vat. The tube C lies just above the bottom of the vat-jacket, and may either rest on it, or, as shown in the drawings, lie supported just above it. The object of the deflector D is to deflect the jets of steam and prevent them striking the bottom or under surface of the vat at once. By this means, when steam for heating is turned on, the spray or steam dashes about, and all parts of the bottom and sides of the vat are simultaneously heated. This I find much superior to the plan of bringing the steam through coils of steam-pipe in the vat, though of course the steam in each case does not come in contact with the cream, but only with the exterior surface of the vessel containing it, the pipes forming an extension of that exterior surface.

F is a tube nicked all round at the bottom with nicks of about one-sixteenth of an inch high. This stands in the bottom of the vat round the hole or plug-well G, and, as it were, filters the material passing. The milk passes easily, but cream, being thicker, passes with more difficulty, or not at all. There can be channels in the bottom of the vat instead of nicks in the pipe, but the nicks are preferable. The office of these nicks is further to draw the milk sidewise from the very bottom, and thus avoid vortices in the milk or the drawing down of the cream from above.

H is a plug at the bottom of this hole, to close the outlet to the contents when required; I, a valve below the plug. This valve is held up by a spring, J, not sufficiently powerful of itself to keep it to its seat against a full head of milk; but when the milk has partly run out and the head lessened the spring has more available power for closing the valve. It can thus be regulated to close the valve automatically when the contents are at any required height in the vat. This regulating is done by screwing up the tube K upon the tube L, so as to screw back the spring to the required degree of compression.

At Z Z in tubes M and G are glass panels, through which the milk can be examined visually and the presence of cream at once detected as it approaches the outlet.

M is a continuation of the outside jacket around the plug-well G.

N is an overflow-slot, shut by a sliding door and handle, P, but capable of being opened to any required extent. Where desirable, as in hot countries, pockets can be made in the jacket for inserting ice; but I have not found them necessary in the English climate at my own works.

R is a channel fixed partly round the jacket to carry off overflow water.

S is the hollow or jacketed cover. This cover has a pipe or nozzle opening into it at each end, and when it is used for cooling or heating, these nozzles can be connected with pipes by rubber hose or otherwise, and hot or cold water circulated through them and the jacketed cover. When in the operation of cooling, moisture condenses on the under surface, and to carry this off and prevent it from dropping into the milk or cream, I rivet or braze to the under side of this cover a series of longitudinal channels, X, each pair formed of a single plate curled round till its two edges, turned up under it, form shallow troughs. Water collecting on the under surface of the cover runs down and passes off at the ends by these troughs.

The mode of operation is as follows: If the apparatus be required for raising cream or skimming, the milk is let into the vat and allowed to stand, the temperature being regulated, if desired, by sending hot or cold water through the pipe C. When the cream has risen, the plug is removed and the milk slowly percolates through the nicks in tube F till the milk has fallen so low that the valve shuts off the further outflow, or the cream gets too thick to pass either the nicks in F or the narrow outlet round the valve, or the attendant, seeing cream draining out, shuts down the plug. To scald this cream, or make Devonshire or clotted cream of it, the cream requires to be heated. I therefore put the cream into the vat in the ordinary manner of making Devonshire or clotted cream and turn on steam below till sufficiently done. The steam is then turned off, and the cream, preferably in its heated state, run into jars and sealed.

I am aware that milk has been prepared for cheese and butter making by heating it through the agency of steam; and this I do not claim. I am not aware, however, that the product known to the trade as "Devonshire cream" has ever been thus produced before.

I claim as my invention—

1. In an apparatus for raising and treating cream, the combination of the vat A, having plug-well G, provided with a glass panel, and pipe F, provided with numerous small orifices round its base, whereby the milk can freely run out, but the thicker cream will be held back and the drawing down of the cream from the surface prevented.

2. In a cream-raising apparatus, the combination, with the vat provided with a well having an exit-orifice, of a valve, I, counterbalanced so as to close when the head of liquid in the vat reaches any required minimum, substantially as and for the purpose described.

3. In cream apparatus, in combination with the vat A and well G, the valve I, spring J, regulated by screwing up its base of support, and tube K, whereby the tension of the spring can be regulated so as to close the valve at any required head of contents of vat.

4. In combination with the perforated pipes C, the saddle E, and the laths D, firmly fixed but adjustable in said saddles, whereby, notwithstanding any unequal jetting of the steam in the pipes, the laths are held firmly against said jets.

5. In combination with the jacketed cream-vat A, having slots N, the sliding doors P and the overflow-channels R, for the purpose described.

In testimony whereof I have signed my name to this specification in the presence of two subscribing witnesses.

WILLIAM HORNER.

Witnesses:
   W. P. THOMPSON,
   I. OWDEN O'BRIEN.